Patented Aug. 18, 1925.

1,550,466

UNITED STATES PATENT OFFICE.

MERWYN C. TEAGUE, OF ELMHURST, NEW YORK, ASSIGNOR TO AMERICAN RUBBER COMPANY, OF EAST CAMBRIDGE, MASSACHUSETTS, A CORPORATION OF MASSACHUSETTS.

PROCESS OF TREATING LATEX AND ARTICLE THEREFROM.

No Drawing. Application filed June 18, 1924. Serial No. 720,732.

*To all whom it may concern:*

Be it known that I, MERWYN C. TEAGUE, a citizen of the United States, residing at Elmhurst, L. I., county of Queens, State of New York, have invented certain new and useful Improvements in Processes of Treating Latex and Article Therefrom, of which the following is a full, clear, and exact description.

This invention relates to a process of treating latex, more particularly to a process for stabilizing and thickening it without coagulation.

In the rubber art rubber doughs and cements made from milled or broken-down rubber have been used for many years almost exclusively for such purposes as coating, dipping, etc. More recently the use of latex in these operations has been introduced to a certain extent. However, latex in its normal concentration is in a sensitive easily coagulated colloidal condition, and when concentrated becomes even more unstable. When latex either in its normal or concentrated condition is compounded with certain of the various fillers, vulcanizers, and other substances commonly used for rubber compounds the stability is still further impaired, and in fact many of the substances which it is desirable to add have the effect of almost at once coagulating it. It is known that certain salts, such as alum and aluminum acetate, when added in appreciable quantities to latex will thicken it, but this thickening appears to be the result of a partial precipitation of the protein constituents of the latex and renders the latter unstable. On account of this precipitation of the protein constituents the particles agglomerate and the latex becomes of a creamy consistency. This cream, however, on standing or by the addition of a slight excess of the precipitant forms a curd which cannot be readily redispersed. If the precipitant be added in small quantity it produces an apparently smooth latex which is thickened sufficiently for some purposes, but on standing it becomes curded and unsuitable for use, while if a large amount of the precipitant is added coagulation quickly occurs. Consequently there is a need in the art of a method for thickening latex or latex compounds without coagulation and at the same time rendering them stable for considerable periods of time.

In my co-pending application Serial No. 719,015, filed June 9, 1924, there is disclosed another method for thickening and stabilizing latex, but the present invention, while capable of use generally, is more particularly designed for use in the making of certain particular classes of rubber goods, as hereinafter specified.

An object of the present invention is to provide an economical process for treating latex to stabilize and thicken it without coagulation.

Another object is to provide a process for stabilizing and thickening latex, without coagulation, by a normally coagulative substance.

A further object is to provide a cheap stabilized and thickened uncoagulated latex.

A still further object is to provide a stabilized and thickened latex compound for use in making light colored goods.

A still further object is to provide a stabilized and thickened uncoagulated latex compound for use in making hard rubber goods or those in which a large amount of softener is undesirable.

The invention consists broadly in adding to latex a substance inherently capable of stabilizing and thickening the latex but which at the same time by reason of decomposition tends to cause coagulation, and preventing such coagulation by the addition of a substance for checking the decomposition.

For a detailed disclosure of the nature and objects of the invention reference is had to the accompanying specification and claims.

It has been found that certain substances which are inherently capable of thickening latex, when added thereto tend to coagulate it. For example sodium silicate when normally added to latex, particularly latex of low ammonia content, usually tends to coagulate it. It appears that the sodium silicate does not itself cause this coagulation, but when added to the latex it hydrolizes and forms sodium hydroxide, which latter then coagulates the latex. Sodium hydroxide in small quantity does not cause coagulation, but when sodium silicate is added in appreciable quantity the concentration of sodium hydroxide becomes sufficient to cause coagulation. I have discovered, however, that this hydrolysis of the silicate can be controlled by the addition of a suitable substance, such as ammonium hydroxide, which by increasing the concentration of hydroxyl ions prevents the hydrolysis of the sodium silicate so that the latter remains distributed in the latex in a thick gelatinous form. For example, if it be desired to obtain a thickened latex, without the addition of compounding ingredients other than those used for the thickening and stabilizing, there may be added to 100 parts of rubber as latex (60% solids) about 10 parts of ammonium hydroxide (28%) and 10 parts of sodium silicate (52° Baumé). By this addition the otherwise quite fluid latex is thickened to a paste or gel consistency, and its stability is increased to such an extent that it may be kept for several months.

As an example of a latex compound thickened and stabilized by my invention the following is given.

100 parts rubber as latex of 60% solids
100 parts whiting
60 parts spindle oil (as emulsion)
5 parts glue
10 parts sodium silicate
10 parts ammonium hydroxide
10 parts water
0.5 parts zinc oxide
3 parts sulphur
0.5 parts zinc dimethyl-dithio carbamate The above example represents a compound thickened and stabilized by my invention, with the use of moderately high pigmentation and a large quantity of softener (spindle oil). It may be cured in one hour at a temperature of 212° F., and is therefore suitable for use with fabrics or papers which it is not desired to heat to the usual high curing temperatures.

The following is another example:

100 parts rubber as latex of 60% solids
100 parts alba whiting
300 parts ground flint
25 parts zinc oxide
85 parts water
100 parts sodium silicate
15 parts ammonium hydroxide
30 parts sulphur
2.5 parts tetramethyl thiuramdisulphide In the above example a high pigmentation has been employed with no softener, but the resulting compound is of a thick, plastic and yet stabilized nature, it can be worked conveniently, and after drying can be cured at 212° F. This compound is particularly adapted for the making of hard rubber articles.

While in all of the above examples ammonium hydroxide is given as the "buffer" for preventing hydrolysis of the sodium silicate, other weak alkalis such as the hydroxides of substituted ammonias may be used. The ammonium hydroxide is preferred, however, on account of its low cost. For the same reason it is preferred to use sodium silicate, although other substances such as potassium silicate may be used.

It will be seen that by my invention a method has been provided for greatly thickening latex, with very high pigmentation if desired, while at the same time stabilizing the latex to such an extent that various compounds may be mixed up in large quantity and kept until used, which latter is a factor of considerable value in factory practice. Owing to the use of very cheap ingredients for obtaining the thickening and stabilizing the method can be very economically carried out, and it is particularly adaptable for use in the manufacture of hard rubber goods, and also in the case of light colored goods, since the nature of the stabilizing and thickening agent is such that it does not tend to darken the finished vulcanized product. Compounds such as described may be used for many processes such as spreading, dipping, extruding, pouring, casting, hand modeling, in some cases, calendering.

While specific embodiments of the invention have been disclosed it is obvious that it is capable of numerous modifications, and it is not desired to limit it otherwise than as set forth in the appended claims.

Having thus described my invention what I claim and desire to protect by Letters Patent is:—

1. The process of treating latex which comprises thickening and stabilizing the latex without coagulation by adding thereto a coagulative thickening and stabilizing agent in the presence of a coagulation preventative.

2. The process of treating latex which comprises thickening and stabilizing the latex by adding thereto an easily decomposable physical thickening and stabilizing agent in the presence of a substance for preventing decomposition of such agent.

3. The process of treating latex which comprises thickening and stabilizing the latex by adding thereto a gelatinous easily decomposable stabilizing agent in the presence of a protecting substance preventing such decomposition.

4. The process of treating latex which comprises thickening and stabilizing the latex by adding thereto an easily decomposable colloidal thickening and stabilizing agent in the presence of a decomposition preventative.

5. The process of treating latex which comprises thickening and stabilizing the latex by adding thereto a hydrolizable thickening and stabilizing agent in the presence of a preventative of hydrolysis.

6. The process of treating latex which comprises thickening and stabilizing the latex by adding thereto a soluble silicate in the presence of an agent for preventing decomposition of said silicate.

7. The process of treating latex which comprises thickening and stabilizing the latex by adding thereto a colloidal silicate in the presence of an agent for preventing decomposition of said silicate.

8. The process of treating latex which comprises thickening and stabilizing the latex by adding thereto an easily decomposable colloidal silicate in the presence of an alkali.

9. The process of treating latex which comprises thickening and stabilizing the latex by adding thereto an alkali silicate in the presence of an alkali.

10. The process of treating latex which comprises thickening and stabilizing the latex by adding thereto sodium silicate in the presence of an egent for preventing hydrolysis of the latter.

11. The process of treating latex which comprises thickening and stabilizing the latex by adding thereto sodium silicate in the presence of ammonium hydroxide.

12. As a new article, uncoagulated thickened and stabilized latex containing a hydrolizable thickening and stabilizing agent and an agent for preventing hydrolysis of the latter.

13. As a new article, uncoagulated thickened and stabilized latex containing a gelatinous hydrolizable stabilizing agent and an alkaline hydroxide.

14. As a new article, uncoagulated thickened and stabilized latex containing a hydrolizable stabilizing agent and ammonium hydroxide.

15. As a new article, uncoagulated thickened and stabilized latex containing a colloidal silicate and a protective agent for the latter.

16. As a new article, uncoagulated thickened and stabilized latex containing an alkaline silicate and a protective agent for the latter.

17. As a new article, uncoagulated thickened and stabilized latex containing sodium silicate and a protective agent for the latter.

18. As a new article, uncoagulated thickened and stabilized latex containing sodium silicate and an alkaline hydroxide.

19. As a new article, uncoagulated thickened and stabilized latex containing sodium silicate and ammonium hydroxide.

Signed at New York, county of New York, and State of New York, this 14 day of June, 1924.

MERWYN C. TEAGUE.